United States Patent [19]
Thorsell

[11] 3,876,222
[45] Apr. 8, 1975

[54] TENSION LIMITING APPARATUS
[75] Inventor: Roland H. Thorsell, Corvallis, Oreg.
[73] Assignee: Kwipco, Inc., Corvallis, Oreg.
[22] Filed: Sept. 5, 1973
[21] Appl. No.: 394,485

[52] U.S. Cl. ............. 280/43.19; 254/174; 214/501
[51] Int. Cl. ........................................... B62d 33/08
[58] Field of Search ............... 254/173 R, 174, 175; 280/43.19; 214/501

[56] References Cited
UNITED STATES PATENTS
| | | | |
|---|---|---|---|
| 394,952 | 12/1888 | Baxter | 254/175 |
| 1,703,743 | 2/1929 | Mair | 254/173 R |
| 2,577,246 | 12/1951 | Hill | 280/43.19 |

Primary Examiner—Albert J. Makay
Assistant Examiner—Kenneth Noland

[57] ABSTRACT

There is disclosed a tension limiting device which is operative to de-energize a winch when tension in the winch line either exceeds a predetermined value or falls below another predetermined value. The device is designed for use in a trailer in which the frame may be raised or lowered relative to the ground. The device incorporates a first lever connected to the winch line which is opposed by a second and third spring biased levers. Suitable limit switches are placed in the path of movement of one of the levers to de-energize the winch.

11 Claims, 8 Drawing Figures

TENSION LIMITING APPARATUS

BACKGROUND OF THE INVENTION

In the shipment of modular buildings, it is highly desirable to provide a trailer or motorized vehicle having a frame or bed which can be raised and lowered relative to the ground in order to facilitate loading and unloading of the building. This type vehicle is backed up to the end of the assembly line and the bed is lowered. The vehicle is then backed under the building. The vehicle bed is raised to a traveling position and transported to the erection site or storage yard. At the erection site, for example, the trailer may be backed between the shoring or cribbing elements and the trailer bed lowered. In such fashion, the modular building is placed directly on its foundation. Thus, a modular building may be moved from its assembly location to its erection site without stressing the structural members thereof as is now common when modular buildings are winched onto an elevated trailer bed.

The disclosure of a vehicle having a bed which is raised or lowered relative to the ground by a cable tensioning arrangement is found in U.S. Pat. No. 3,043,566. Tension responsive limit switches are disclosed in U.S. Pat. Nos. 2,600,568; 3,032,321; 3,325,611 and 3,423,661.

It is an object of this invention to provide an improved tension limiting device which is rugged, reliable and relatively inexpensive.

In summary, the apparatus of this invention comprises an elongate tensile element and means for tensioning and relaxing the element and means for driving the last mentioned means; and means responsive to tension in the element for deactivating the driving means including a frame; a first lever, pivotally mounted on the frame, connected to the element away from the pivotal mounting for biasing the first lever in a first direction in accordance with the tension in the element; means biasing the first lever in a second opposite direction including a second pivotally mounted lever and a spring biasing the same against the first lever in opposition to the tension in the element; a switch actuator carried by one of the levers, defining a path of movement; and a limit switch, mounted in the path of movement, actuable by the switch actuator for de-energizing the driving means.

IN THE DRAWINGS

Figure 1:
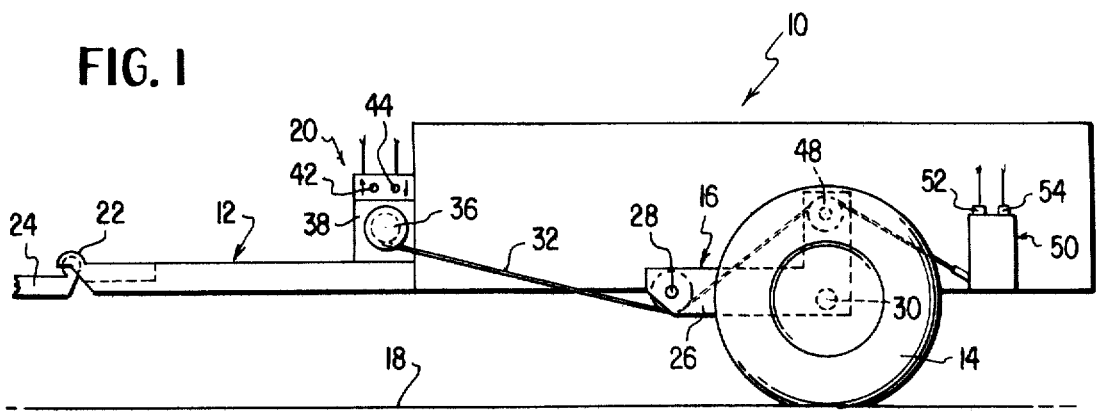
FIG. 1 is a schematic side elevational view illustrating a trailer having a frame movable relative to an underlying ground surface which is positioned for travel.
Figure 2:
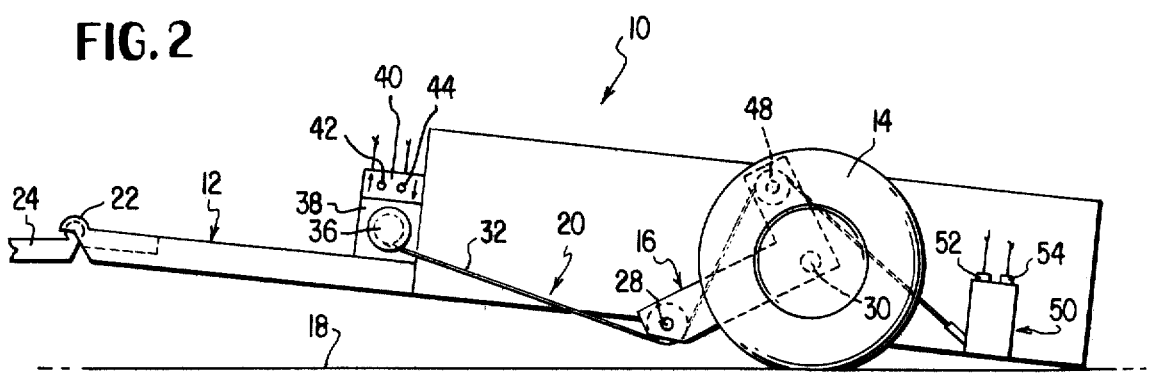
FIG. 2 is a view similar to FIG. 1 illustrating the trailer in a lowered position for loading or unloading the modular building therefrom.
Figure 3:
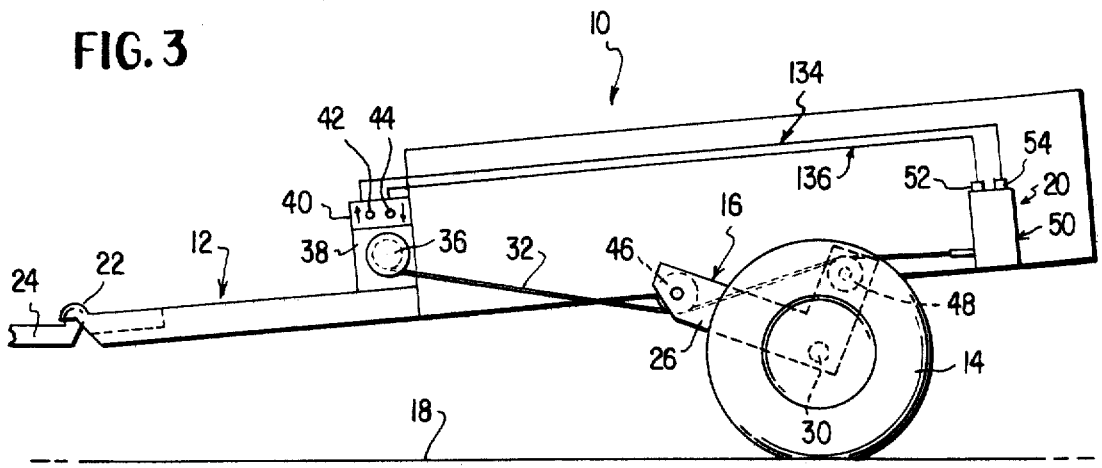
FIG. 3 is a view similar to FIGS. 1 and 2 illustrating the trailer bed in an uppermost position.

Referring to FIGS. 1–3, there is illustrated a vehicle 10 having a frame 12, a pair of wheels 14, a pair of means 16 for adjustably mounting the wheels 14 on the frame 12 between an upper position (FIG. 3) and a lower position (FIG. 2) in which the frame 12 contacts the ground surface 18 and means 20 for moving the mounting means 16 between the various positions illustrated in FIGS. 1–3.

The wheels 14, means 16 for adjustably mounting the wheels 14 on frame 12 between an upper position (FIG. 3) and a lower position (FIG. 2) in which the frame 12 contacts the ground surface 18 and means 20 for moving the mounting means 16 between the various positions illustrated in FIGS. 1–3 is identical on both sides of the vehicle 10. The height of each side of frame 12 above ground 18 can then be independently adjusted. The description that follows applies to the invention as applied to side of the trailer not shown.

The adjustable mounting means 16 may be of any suitable type but conveniently includes a pair of levers 26 each of which is pivotally mounted by a suitable pin 28 to the frame 12. The wheels 14 are mounted for rotation on the levers 26 by suitable bearings 30.

The moving means 20 comprises a pair of elongate tensile elements or cables 32, 34 interengaged between the frame 12 and the adjustable mounting means 16 as will be more fully apparent hereinafter. There is provided a winch 36 with a divided drum on which the cables 32, 34 are wound. A motor 38, such as a reversible direct current motor, is drivably connected to winche 36 for driving the same in either the winding or unwinding directions. A control box 40 provides an up switch 42 for moving the trailer frame 12 toward the position illustrated in FIG. 3 and a down switch 44 for moving the frame 12 toward the position of FIG. 2. The cables 32, 34 are threaded under a first sheave 46 coaxial with the pivot axis of the lever 26 and over a second sheave 48 pinned to the lever 26. It will be evident that the bearing 30 and the sheaves 46, 48 are arranged in triangular fashion to allow raising and lowering of the frame 12 as more fully explained hereinafter.

The free ends of the cables 32, 34 connect to a tension limiting device 50 shown in more detail in FIGS. 4–7. The tension limiting device 50 includes a low tension limit switch 52 connected in circuit with the down switch 44 and a high tension limit switch 54 connected in circuit with the up switch 42. The input to the tension limiting device 50 is necessarily the tension in the cables 32, 34 while the output therefrom comprises the limit switches 52, 54.

Switch 42 and switch 44 are interlocked in such a manner that when one switch is closed, the other is prevented from being closed. Various methods for accomplishing the interlocking function are known to the art.

Figure 5:
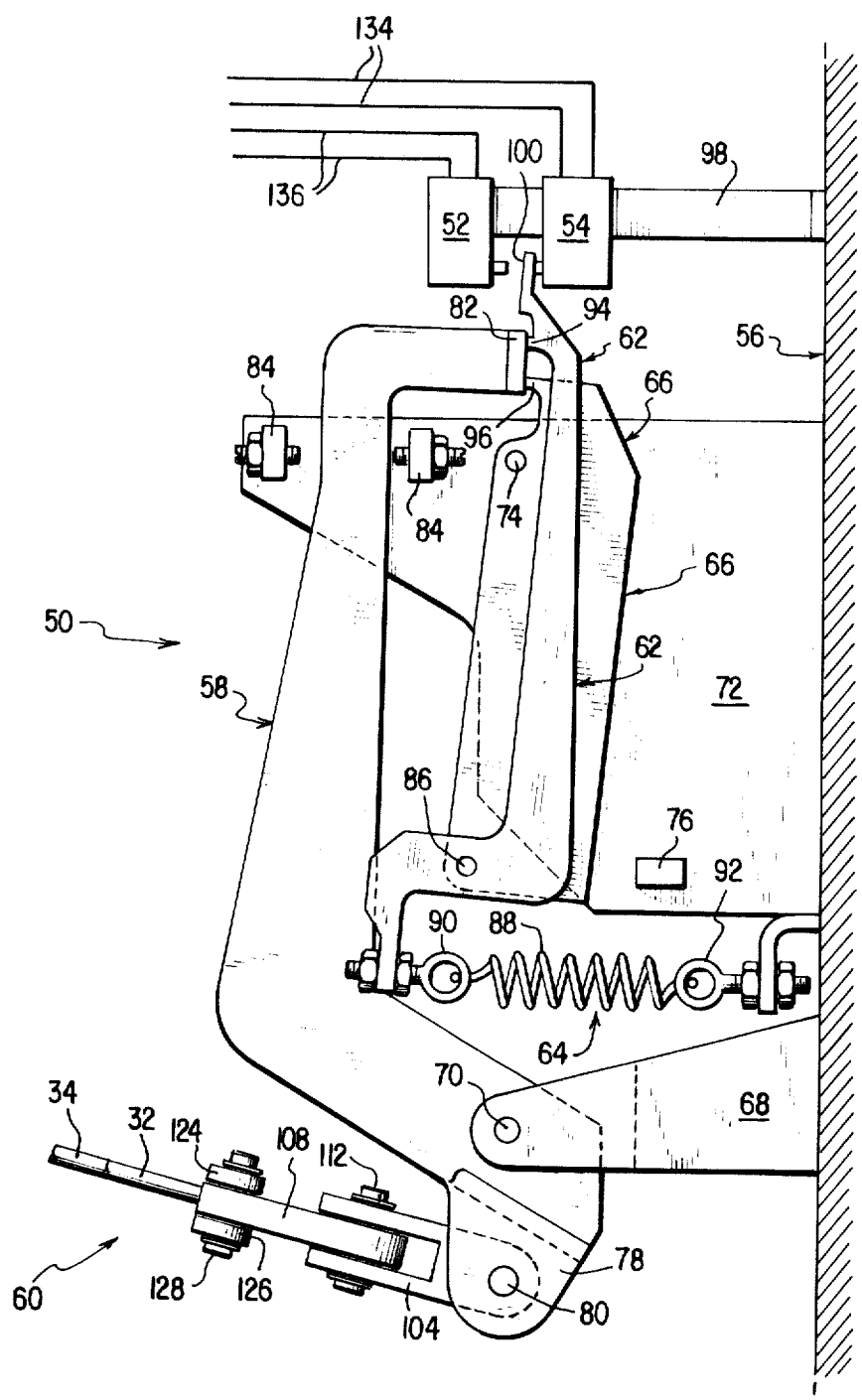
FIG. 5 is a view similar to FIG. 4 illustrating the tension limiting device sensing high tension in the cables.
Figure 6:
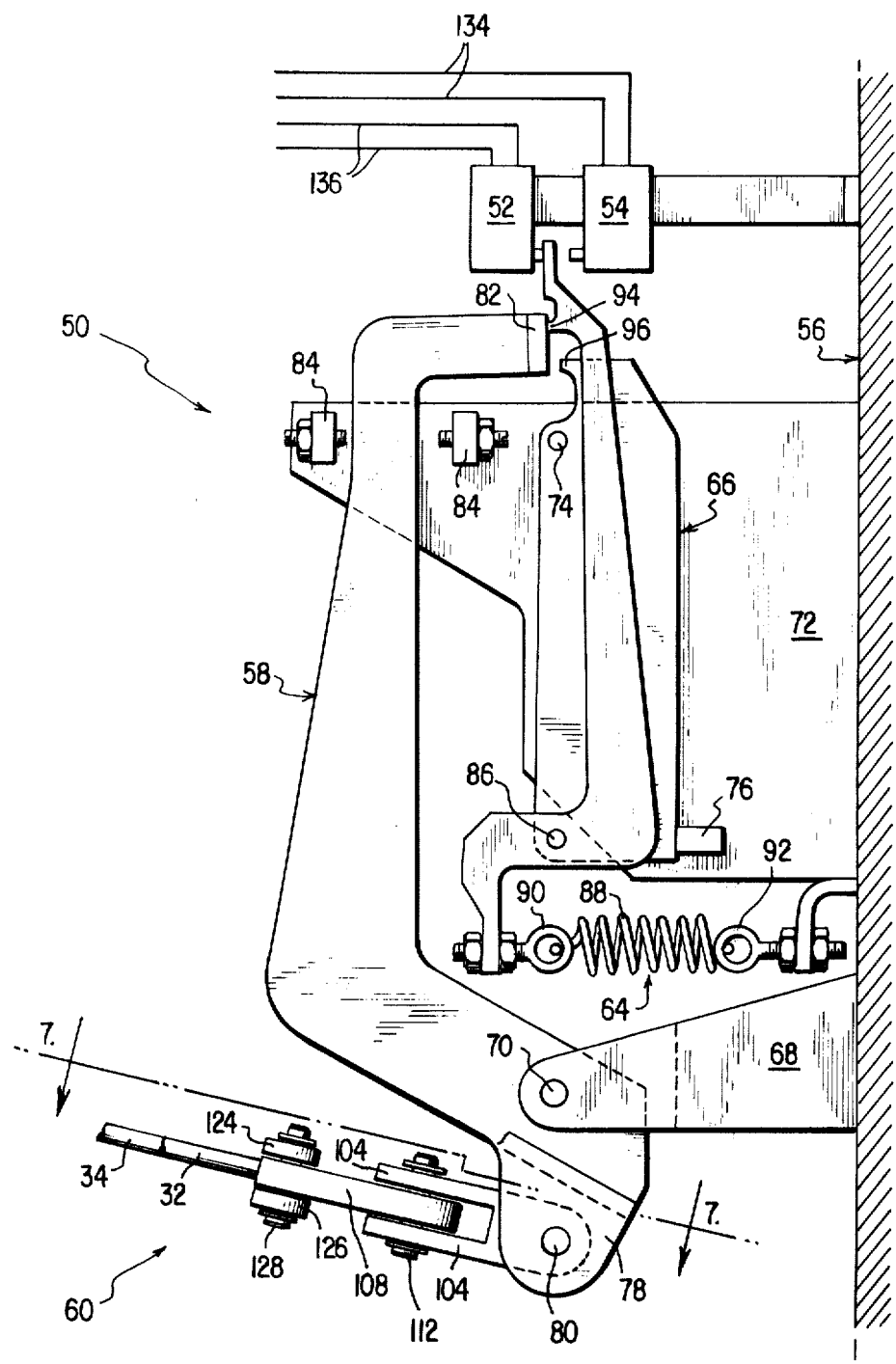
FIG. 6 is a view similar to FIGS. 4 and 5 illustrating the arrangement of parts upon sensing of low tension in the cables.
Figure 7:
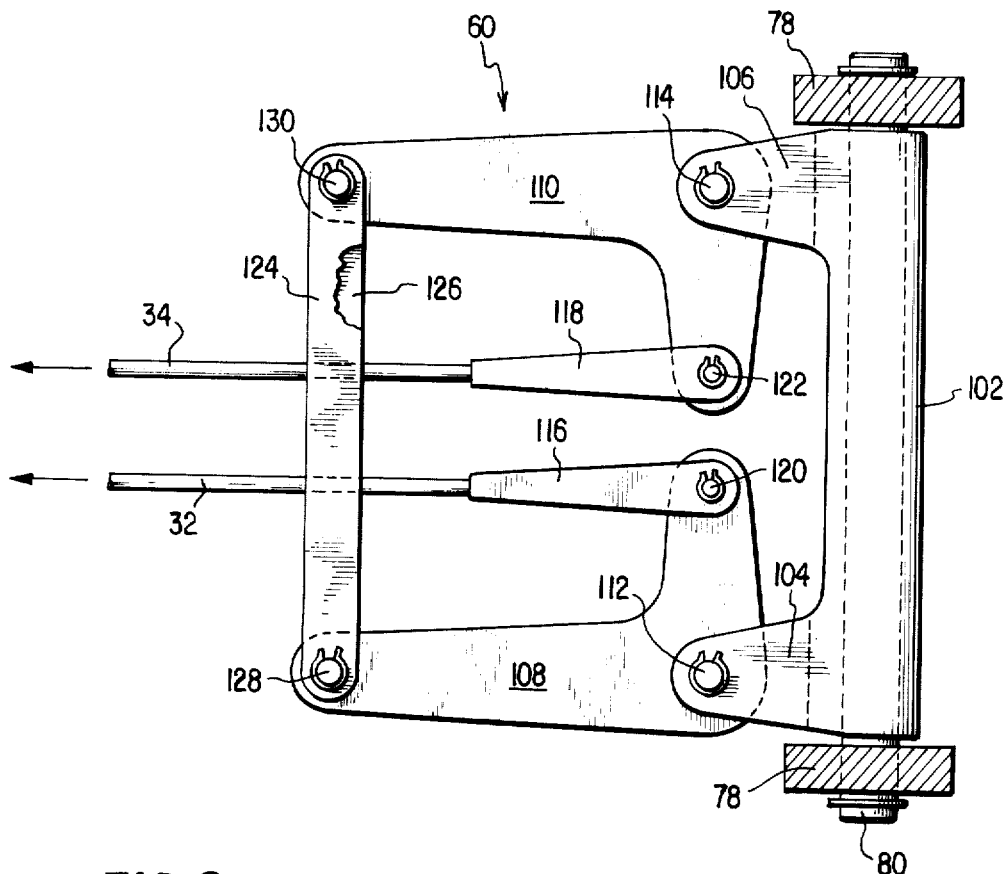
FIG. 7 is a cross sectional view of the tension limiting device of FIG. 6 taken substantially along line 7—7 thereof as viewed in the direction indicated by the arrows.

In general operation, the trailer frame 12 is moved from the travel or intermediate position of FIG. 1 to the lower or loading position of FIG. 2 by depressing the down switch 44. The motor 38 accordingly drives the winches 36 in the unwinding direction to pay off cables 32, 34. The trailer frame 12 accordingly moves toward the ground 18. If the operator is not paying attention the frame 12 touches the ground. As the frame 12 touches the ground 18, as shown in FIG. 2, tension in the cables 32, 34 abruptly drops thereby opening the low tension limit switch 52 as shown in FIG. 6. The circuit driving the motor 38 in the unwinding direction is accordingly opened to cease downward movement of the frame 12. The trailer 10 may then be loaded. The up switch 42 is then depressed thereby completing a circuit for driving the motor 38 in a winding direction. The cables 32, 34 are accordingly wound onto the winch 36 thereby raising the trailer frame 12 from the position of FIG. 2 toward the position of FIG. 1. If the operator is paying attention, he disengages the up switch 42 at a desired traveling position such as shown in FIG. 1. If the operator is inattentive, the trailer frame 12 proceeds to the position of FIG. 3 and maximum tension is applied to the cables 32, 34 thereby positioning the tension limiting device 50 in the attitude shown in FIG. 5 whereupon the high tension limit switch 54 is activated. Activation of the switch 54 opens the circuit acting to drive the motor 38 in a winding direction. Accordingly, further upward movement of the frame 12 is prevented thereby preventing the overstressing of the cables 32, 34. The operator may then depress the down switch 44 to move the vehicle 10 to the traveling position as shown in FIG. 1.

After the vehicle 12 arrives at the unloading site, e.g., a building erection site or a storage yard, the frame 12 may be moved to the uppermost position shown in FIG. 3 in order to spot the modular building on an elevated foundation. This is accomplished by driving the vehicle 10 to a location adjacent the foundation and activating the up switch 42. The motor 38 is accordingly driven in a direction to wind cable onto the winch 36 thereby pivoting the lever 26 in a clockwise direction. When the maximum design tension is placed in the cables 32, 34, the tension limiting device 50 assumes the configuration shown in FIG. 5 thereby activating the high tension limit switch 54 and opening the circuit to the motor 38 which acts to elevate the trailer frame 12. The trailer 12 is then driven to position the building immediately above the foundation. The down switch 44 is then activated to lower the frame 12 and thereby place the modular building on its foundation.

It is accordingly apparent that the vehicle 10 provides a rapid and convenient manner for transporting modular buildings and, in particular, avoids placing substantial stresses on the structural members of the building as now occurs when such buildings are winched onto an elevated trailer or truck bed.

Referring to FIGS. 4-7, the operative mechanisms of the tension limiting device 50 are shown in detail. The device 50 comprises a rigid framework 56 which is rigidly secured to the trailer frame 12 or may comprise part thereof. There is provided a first lever 58 operatively connected by means 60 to the cables 32, 34. The lever 58 is accordingly biased in a clockwise direction by the cumulative force or tension in the cables 32, 34. The device 50 includes a second lever 62 biased by a spring mechanism 64 in a counter clockwise direction in a path of movement engaging the first lever 58. The force of the spring mechanism 64 accordingly provides a moment resisting movement of the first lever 58 as will be more fully apparent hereinafter. The device 50 also includes a third lever 66 which carries the fulcrum of the second lever 62 and which provides a substantial mechanical advantage for resisting movement of the first lever during the application of high tension to the cables 32, 34. As will be more fully apparent hereinafter, the resistive moment afforded by the third lever 66 is eliminated during the application of low tension to the cables 32, 34. Accordingly, the first lever 58 moves relatively easily during activation of the low tension limiting switch 52 and moves against a substantial resistance during activation of the high tension limit switch 54.

The framework 56 includes a bracket 68 providing the fulcrum for the lever 58 as by the provision of a conventional pin 70. The framework 56 also includes a bracket 72 providing the fulcrum for the third lever 66 which comprises a pin 74. The bracket 72 carries a stop or abutment 76 which acts to change the resistive moment of the combined levers 62, 66 as will be more fully apparent hereinafter.

The first lever 58 includes a pair of ears 78 secured to the connecting means 60 by a suitable pin 80. The opposite end of the first lever 58 provides a relatively flat plate 82 of sufficient size to engage the levers 62, 66 as is apparent from FIGS. 4 and 5. A pair of abutments 84 are disposed at the ends of the path of movement of the lever 58 thereby providing movement in a limited range which will not damage the limit switches 52, 54.

The second lever 62 is connected by a suitable pin 86 to the third lever 66. The spring mechanism 64 includes a spring 88 of any suitable type, for example helical, connected at one end to the lever 62 in any suitable fashion, as by the use of an eye 90, and secured at the other end to the framework 56, as by the use of a similar eye 92. The spring 88 accordingly biases the second lever 62 in a counterclockwise direction to place an extension 94 in bearing contact with the plate 82 of the first lever 58.

The third lever 66 is configured to engage the abutment 76 during counterclockwise movement of the lever 62 for purposes more fully explained hereinafter. The third lever 66 includes an extension 96 for abutting the plate 82 of the first lever 58 at least during application of high tension to the cables 32, 34.

Figure 4:
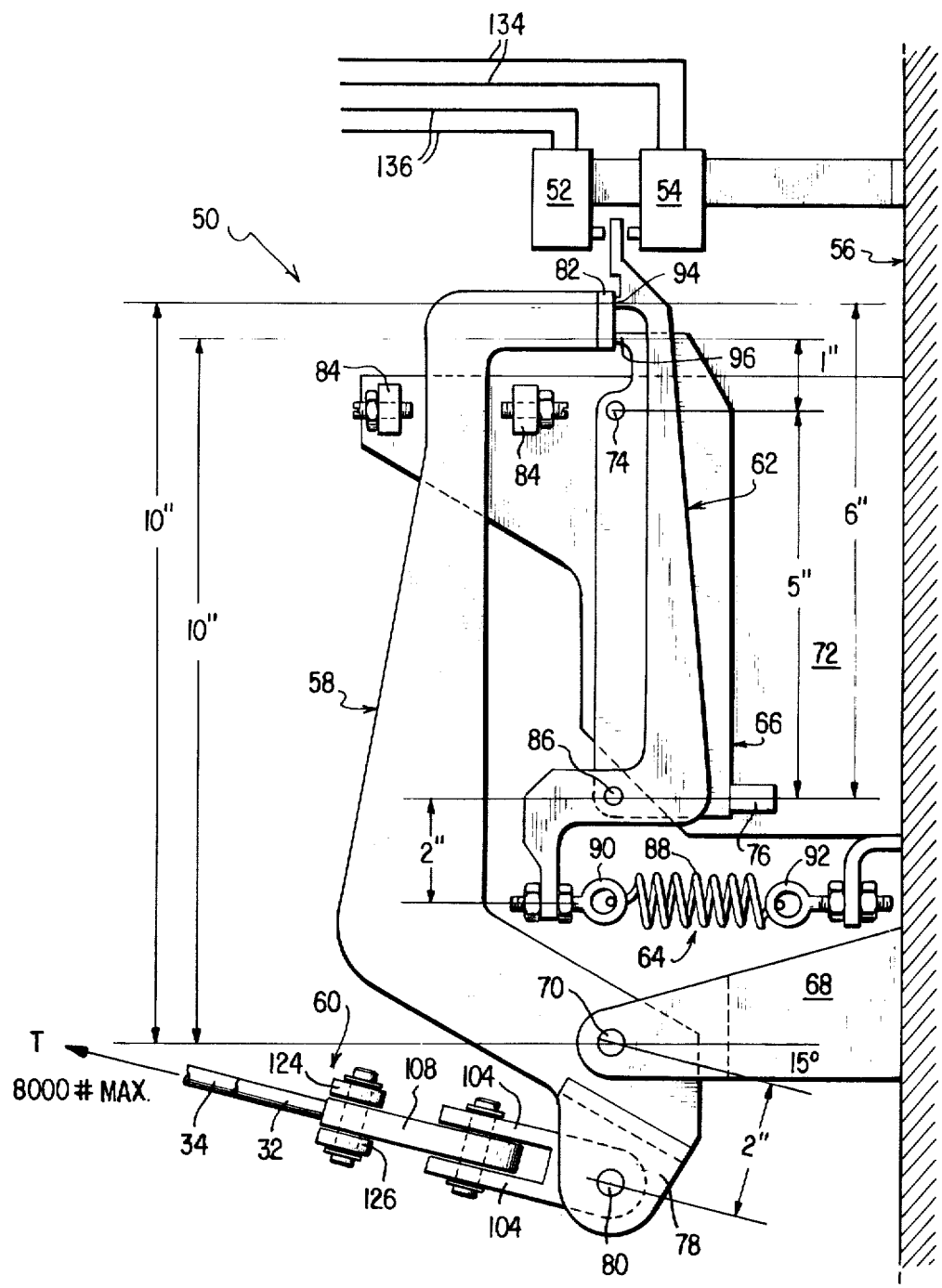
FIG. 4 is an enlarged side elevational view of a tension limiting device in accordance with this invention.

FIG. 4 illustrates the configuration of the tension limiting device 50 corresponding to the travel position of FIG. 1. For purposes of illustration, it is assumed that the down switch 44 is activated to lower the trailer frame 12. It is assumed for purposes of illustration that the combined tensile force in the cables 32, 34 is on the order of about 6,000 pounds at the inception of downward movement of the frame 12. As the cables 32, 34 unwind from the winch 36, the frame 12 ultimately contacts the ground 18 and transfers a substantial portion of the load thereto. The tension in the cables 32, 34 accordingly drops abruptly. Since the third lever 66 is restrained against counterclockwise movement from the position in FIG. 4, the second lever 62 alone is resisting movement of the first lever 58. As the combined tensile force in the cables 32, 34 approaches several hundred pounds, for example, the spring 88 is capable of moving the lever 62 in a counterclockwise direction thereby actuating the low tension limit switch 52 and opening the circuit which drives the motor 38 in an unwinding direction. Accordingly, lowering of the trailer frame 12 stops. In the actuation of the low tension limit switch 52, it will be seen from FIG. 6 that the third lever 66 disengages from the plate 82 of the first lever 58. Accordingly, the mechanical advantage of the combined levers 62, 66 is the ratio between the lever arms on opposite sides of the pin 86.

After the trailer 10 is loaded, the up switch 42 is activated to drive the motor 38 in a winding direction. As the combined tensile force in the cables 32, 34 increased slightly, the lever 58 is capable of pushing the second lever 62 from the configuration of FIG. 6 to the configuration of FIG. 4. The low tension limit switch 52 is thereby disengaged and the circuit which acts to drive the motor 38 in the unwinding direction is conditioned to again drive the motor 38 in the unwinding direction.

The high tension limit switch 54 is actuated either when the trailer 10 is overloaded or when the frame 12 is raised to its uppermost position illustrated in FIG. 3. When either of these events occur, the combined tensile force in the cables 32, 34 is substantial, for example on the order of about 8,000 pounds. The lever 58 is accordingly biased in a clockwise direction as shown in FIGS. 4 and 5. The lever 58 accordingly biases the second lever 62 and the third lever 66 in a clockwise direction. As the third lever 66 begins to disengage from the abutment 76, the restraining moment imparted to the first lever 58 by the levers 62, 66 abruptly increases. This may be seen from a comparison of the following examples.

EXAMPLE I

In this example, the third lever 66 is fully and firmly engaged with the abutment 76. The force of the spring 88 is assumed to be 200 pounds. The distance from the eye 90 to the pin 86 is assumed to be two inches. The distance from the pin 86 to the bearing extension 94 is assumed to be six inches. Frictional forces in the pivot connection 86 and between the extension 94 and plate 82 are disregarded. The maximum force that the levers 62, 66 can resist when the third lever 66 is in full engagement with the stop 76 may be calculated from a summation of moments about the pivot pin 86 as follows:

$\Sigma M_{86} = +(200 \text{ lbs.})(2'') - F(6'') = 0$
$F = (200)(2)/6 = 66.7 \text{ lbs.}$

EXAMPLE II

In this example, the lever 66 is out of engagement with the stop 76 and is accordingly operative to resist movement of the lever 58. The distance from the eye 90 to the pivot 74 is assumed to be 7 inches and the distance from the pin 74 to the bearing extension 96 is assumed to be one inch. The maximum force that can be resisted by the combined levers 62, 66, when the lever 66 is operative, may be calculated from the summation of moments about the fulcrums 86, 74 as follows:

$\overset{+}{\Sigma}M_{86} = 200(2) - F_1(6) = 0$
$F_1 = \dfrac{400}{6} = 66.7$ $\overset{+}{\Sigma}M_{74} = F_{86}(5) - F_2(1) = 0$
$F_{86} = 200 + F_1$ $\overset{+}{\Sigma}M_{74} = (200 + 66.7)(5) - F_2(1) = 0$
$F_2 = 5(266.7) = 1333.5$
$F_1 + F_2 = 1400.2 \text{ lb.}$ It is accordingly evident that the third lever 66 is inoperative when the spring 88 biases the same into engagement with the abutment 76. Accordingly, the second lever 62 provides alone a resistance against movement of the lever 58 at a low level of tension in the cables 32, 34. As the force applied through the cables 32, 34 begins to increase, the lever 58 tends to rotate in a clockwise direction from the position of FIG. 4 toward the position of FIG. 5. Little or no movement of the levers 58, 62, 66 occurs until the combined tensile force in the cables 32, 34 is sufficiently great to commence movement of the lever 66 away from the position shown in FIG. 4. From a comparison of Examples I and II, it will be evident that the force applied by the third lever 66 in resisting movement of the first lever 58 is on the order of 20 times as great as the resistive force applied by the second lever 62. It will accordingly be seen that the abutment 76 renders the third lever 66 inoperative until the combined tensile force in the cables 32, 34 increases to a relatively high level.

For purposes of illustration, the limit switches 52, 54 are illustrated as mounted on a bracket 98 projecting from the framework 56. The switches 52, 54 may conveniently be mounted on the bracket 72 if desired. The second lever 62 is illustrated as providing a switch actuator 100 although the switch actuator may conveniently comprise part of the first lever 58. The switch actuator 100 is mounted in a path of movement extending in the same direction as movement of the lever 62 as will be evident.

A common problem with multiple line winches, such as the winch 36, is that the cables 32, 34 are unequally stressed. Without corrective provisions, there is a high incidence of cable failure and the combined capacity of the cables 32, 34 is less than twice the capacity of either of the cables 32, 34. As a corrective measure, the connecting means 60 comprises an equalizer for applying substantially equal forces to the lever 58 as illustrated most clearly in FIG. 7. The connecting means 60 includes a sleeve 102 surrounding the pivot pin 80 and provides spaced pairs of ears 104, 106. A bellcrank 108, 110 is pivotally connected by a pin 112, 114 to the ears 104, 106 respectively. The cables 32, 34 are respectively secured to the short arm of the bellcranks 108, 110 as by conventional cable ends 116, 118 and pins, 120, 122 respectively. The long arms of the bellcranks 108, 110 are interconnected by a pair of links 124, 126 cooperating with pins 128, 130.

If the cables 32, 34 are equally tensioned, the equalizing feature of the connecting means 60 is inoperative and equal forces are applied to the ears 104, 106 of the sleeve 102. For purposes of illustration, it may be assumed that the tension in the cable 32 is substantially greater than the tension in the cable 34. Under this circumstance, the bellcrank 108 tends to rotate in a counterclockwise direction as viewed in FIG. 7 thereby reducing the stretch in the cable 32 somewhat thereby decreasing tension therein. The links 124, 126 act to transmit counterclockwise rotation of the bellcrank 108 into clockwise rotation of the bellcrank 110 thereby elongating the cable 34 and increasing tension therein. In the adjusted position of the connecting means 60, the cables, 32, 34 are equally stressed.

Figure 8:
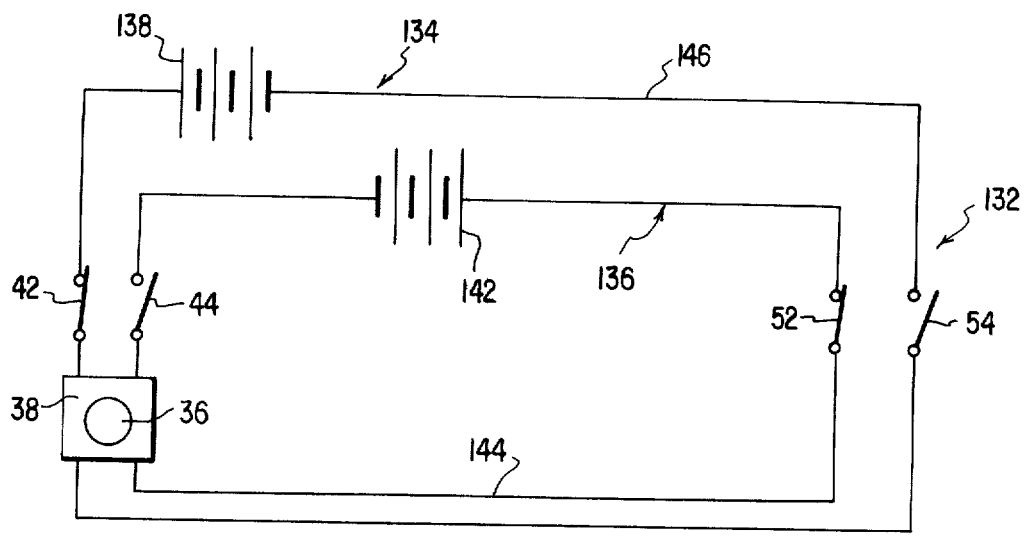
FIG. 8 is a schematic view of an electrical circuit operative in this invention.

Referring to FIG. 8, there is illustrated a rudimentary electrical circuit 132 connecting the motor 38, the switches 42, 44 and limit switches 52, 54 with a suitable source of energy such as a direct current source. The motor 38 is conveniently a reversible direct current motor for driving the winch 36 in the winding and unwinding directions. For purposes of simplicity, the circuit 132 is illustrated as comprising separate subcircuits 134, 136 for driving the motor 38 in the tensioning and relaxing directions respectively. The subcircuit 134 comprises a direct current source 138 such as a battery, DC generator or rectified alternator. The switches 42, 54 are placed in series with the source 138 and motor 38 by suitable wiring 140. The circuit 136 comprises a source of direct current 142 placed in series with the switches 44, 52 and a motor 38 by suitable wiring 144.

The position of the various switches illustrated in FIG. 8 corresponds to the vehicle position indicated in FIG. 3 in the torque limiting device position indicated in FIG. 5. The switches 42, 44 are normally open while the limit switches 52, 54 are normally closed. As indicated in FIG. 8, the up switch 42 has been activated to close the circuit 132 which powers the motor 38 to wind up the cables 32, 34 and thereby elevate the trailer frame 12 relative to the ground 18. The open position of the switch 54 indicates that it has been opened by the switch actuator 100 in response to excessive tensile force in the cables 32, 34 thereby de-energizing the motor 38 in the winding direction. It will be evident that the circuit 134 will remain open until the switch actuator 100 retreats from the limit switch 54 thereby allowing the switch 54 to assume its normally closed position. It will be evident that the circuit 136 is unaffected by opening of the switch 54 thereby allowing the operator to depress the down switch 44 thereby energizing the motor 38 in the unwinding direction to pay out the cables 32, 34 and thereby lower the trailer frame 12.

Of some interest is when the switch actuator 100 retreats out of engagement with either of the switches 52, 54 thereby enabling a de-energized circuit to again be closed for operating the motor 38. In a prototype constructed in accordance with the principles of this invention, the low tension limit switch 52 opens when the combined tensile force in the cables 32, 34 falls to about 300 pounds. The switch actuator 100 retreats from engagement with the limit switch 52 when the combined tensile force in the cables 32, 34 rises to about 350 pounds. The high tension limit switch 54 opens when the combined tensile force in the cables 32, 34 reaches approximately 8,000 pounds. The switch actuator 100 retreats from the limit switch 54 when tension in the cables 32, 34 falls to about 6,500 pounds.

I claim:

1. Apparatus comprising an elongate tensile element and means for changing the stress in the element in both tensioning and relaxing directions; and means responsive to a first low level and a first higher level tension in the element for deactivating the stress changing means in the relaxing and tensioning directions respectively including a frame; a first member movably mounted on the frame and connected to the element for moving the first member in a first direction in accordance with tension in the element; means, including a second member movably mounted on the frame for biasing the first member in a second opposite direction at a first small force upon application of the first low level of tension to the element and for biasing the first member in the second direction at a second larger force upon application of the first higher level of tension to the element; a switch actuator carried by one of said members defining a path of movement extending in the first and second directions, the actuator having a neutral position intermediate the path; a first low tension and a second high tension limit switch disposed in the path of movement in the second and first directions respectively from the neutral position; the first member biasing means including means biasing the second member against the first member; and a third member movably mounted on the frame, and means inoperative upon the application of the first low level of tension to the element and operative upon the application of the first higher level of tension to the element for biasing the third member against the first member.

2. The apparatus of claim 1 wherein the means biasing the second member includes a spring connected between the frame and the second member for continuously biasing the second member against the first member.

3. The apparatus of claim 1 wherein the means biasing the third member comprises a spring biasing the third member continuously in the second direction and an abutment for engaging the third member and preventing movement thereof in the second direction beyond a predetermined limit.

4. The apparatus of claim 3 wherein each of the members comprises a lever.

5. The apparatus of claim 4 comprising means pivotally mounting the first and third levers to the frame and means pivotally mounting the second lever to the third lever, the means biasing the second and third levers comprising a spring connected between the frame and the second lever for continuously biasing the second and third levers in the second direction.

6. The apparatus of claim 4 wherein the pivotal connections of the first, second and third levers are generally aligned in the neutral position of the switch actuator.

7. The apparatus of claim 4 wherein the distance between the third lever pivotal connection and the point of engagement of the first and third levers is substantially less than the distance between the second lever pivotal connection and the point of engagement of the first and second levers.

8. The apparatus of claim 4 comprising a pair of elongate elements and means pivotally connecting the pair of elongate elements to the first lever.

9. The apparatus of claim 8 wherein the pivotal connecting means comprises means for equalizing tension in the pair of elongate elements upon application of unequal tension thereto.

10. The apparatus of claim 9 wherein the connecting means includes first and second ears and the equalizing means includes first and second connecting levers pivotally mounted to the first and second ears respectively, the elongate elements being separately connected to the first and second connecting levers away from the pivotal mounting thereof, and means linking the first and second connecting levers together.

11. The apparatus of claim 6 further comprising a vehicle including a frame; means for movably supporting the frame on an underlying surface; means adjustably mounting the movable support means on the frame between an upper position and a lower position in which the frame rests on the underlying surface; and means for moving the support means relative to the frame including the elongate element and the means for changing the stress in the elongate element, the elongate element being interengaged between the frame and the mounting means.

* * * * *